(12) United States Patent
Prandi

(10) Patent No.: US 8,347,715 B2
(45) Date of Patent: Jan. 8, 2013

(54) VARIABLE CAPACITANCE ELECTRONIC DEVICE AND MICROELECTROMECHANICAL DEVICE INCORPORATING SUCH ELECTRONIC DEVICE

(75) Inventor: Luciano Prandi, Bellinzago Novarese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 406 days.

(21) Appl. No.: 12/635,453

(22) Filed: Dec. 10, 2009

(65) Prior Publication Data

US 2010/0149721 A1 Jun. 17, 2010

(30) Foreign Application Priority Data

Dec. 11, 2008 (IT) .............................. TO2008A0924

(51) Int. Cl.
 *G01C 19/00* (2006.01)
(52) U.S. Cl. ................................. 73/504.12; 73/504.18
(58) Field of Classification Search ............... 73/504.12, 73/504.14, 504.02, 504.04, 514.32, 504.18
See application file for complete search history.

(56) References Cited

U.S. PATENT DOCUMENTS

| 6,661,283 | B1 * | 12/2003 | Lee .................................. 330/9 |
| 6,949,937 | B2 * | 9/2005 | Knoedgen ...................... 324/658 |
| 7,168,320 | B2 * | 1/2007 | Murata et al. .............. 73/514.32 |
| 7,595,648 | B2 * | 9/2009 | Ungaretti et al. ............. 324/678 |
| 7,827,864 | B2 * | 11/2010 | Prandi et al. ................ 73/504.18 |
| 7,898,448 | B2 * | 3/2011 | Murakami et al. ............ 341/143 |
| 2003/0025983 | A1 | 2/2003 | Lasalandra et al. |

FOREIGN PATENT DOCUMENTS

| EP | 0132885 A1 | 2/1985 |
| EP | 1959562 A1 | 8/2008 |

* cited by examiner

*Primary Examiner* — Helen C. Kwok
(74) *Attorney, Agent, or Firm* — Seed IP Law Group PLLC

(57) ABSTRACT

An electronic device includes a capacitive component with variable capacitance coupled to a control stage that controls the capacitance based on a reference signal, with a reference frequency, and an excitation signal, that is a multiple of the reference frequency. The capacitive component includes a variable capacitive network having a plurality of switched capacitors, each being switchable between a first configuration, where it is connected between connection terminals of the capacitive component, and a second configuration, where it is connected at most to one of the connection terminals. The control stage includes a logic module, coupled to the variable capacitive network for switching periodically each capacitor between the first configuration and the second configuration. A sign circuit, coupled to the capacitive component supplies a control signal having edges concordant with the excitation signal in one half-period of each cycle of the reference signal and discordant edges in the other half-period.

25 Claims, 7 Drawing Sheets

VARIABLE CAPACITANCE ELECTRONIC DEVICE AND MICROELECTROMECHANICAL DEVICE INCORPORATING SUCH ELECTRONIC DEVICE

BACKGROUND

1. Technical Field

The present disclosure relates to a variable-capacitance electronic device and to a microelectromechanical device incorporating such electronic device.

2. Description of the Related Art

As is known, the use of microelectromechanical systems (MEMS) is encountering an increasingly widespread use in various sectors of technology and has yielded encouraging results especially in the production of inertial sensors, micro-integrated gyroscopes, and electromechanical oscillators for a wide range of applications.

MEMS of this type are usually based on microelectromechanical structures comprising at least one mass, which is connected to a fixed body (stator) by springs and is movable with respect to the stator according to pre-set degrees of freedom. The movable mass and the stator are capacitively coupled through a plurality of respective electrodes, mutually facing so as to form capacitors. The movement of the movable mass with respect to the stator, for example on account of an external load, changes the capacitance of the capacitors. From this change it is possible to trace back to the relative displacement of the movable mass with respect to the fixed body and hence to the force applied. Vice versa, by supplying appropriate biasing voltages, it is possible to apply an electrostatic force to the movable mass to set it in motion. In addition, in order to provide electromechanical oscillators, the frequency response of the inertial MEMS structures is exploited, which is typically of a second-order low-pass type, with a resonance frequency.

MEMS gyroscopes have a more complex electromechanical structure. In these devices, a first movable mass, or driving mass, is set in oscillation according to an axis at a pre-set frequency and drives in the oscillatory motion a second mass, or detection mass, which is constrained to the driving mass so as to have a relative degree of freedom. When the gyroscope undergoes a rotation about a given axis with an angular velocity, the detection mass is subject to a Coriolis force as a result of the driving action and moves in accordance with the relative degree of freedom. The displacements of the detection mass can be detected and transduced into electrical signals, which are amplitude-modulated proportionally to the angular velocity, with a carrier at the frequency of oscillation of the driving mass. The use of a demodulator makes it possible to obtain the modulating signal and hence to trace back to the instantaneous angular velocity.

In many cases, the acceleration signal that carries information on the instantaneous angular velocity contains also spurious components that are not determined by the Coriolis acceleration and hence present as disturbance. Sometimes, the spurious components depend upon inevitable constructional imperfections of the MEMS part, due to the limits of precision and to the dispersion of the manufacturing processes. For example, the oscillation axis of the driving mass could, on account of a fault in making the constraints, be misaligned with respect to the direction theoretically expected. This type of defect commonly causes a quadrature-signal component, which adds to the useful signal due to the rotation of the gyroscope. Obviously, the consequences are a degraded signal-to-noise ratio and altered dynamics of a reading interface, at the expense of the signal to be read, to an extent that depends on a degree of the defects.

BRIEF SUMMARY

The present disclosure provides an electronic device and a microelectromechanical device that enables compensation of the disturbance components described above.

According to the present disclosure a variable-capacitance electronic device and a microelectromechanical device incorporating said electronic device are provided. The electronic device includes a capacitive component, having a variable capacitance and a control stage, coupled to the capacitive component configured to control the variable capacitance, based on a reference signal, having a reference frequency, and on an excitation signal, having an excitation frequency that is a multiple of the reference frequency; wherein the capacitive component comprises a variable capacitive network having a plurality of switched capacitors. Each of the switched capacitors is selectively switchable between a first configuration, in which the switched capacitor is connected between a first signal terminal and a second signal terminal of the capacitive component, and a second configuration, in which the switched capacitor is connected to at most one of the first signal terminal and the second signal terminal. The control stage comprises a logic module, coupled to the variable capacitive network and configured to periodically switch each switched capacitor between the first and the second configuration, based on the reference signal. The electronic device also includes a sign circuit, coupled to the capacitive component and configured to provide a control signal having concordant edges with the excitation signal in one half-period of each cycle of the reference signal and discordant edges with the excitation signal in the other half-period of each cycle of the reference signal.

BRIEF DESCRIPTION OF THE SEVERAL VIEWS OF THE DRAWINGS

For a better understanding of the disclosure, an embodiment will be now described, purely by way of non-limiting example and with reference to the attached drawings, wherein.

DETAILED DESCRIPTION

Figure 1:
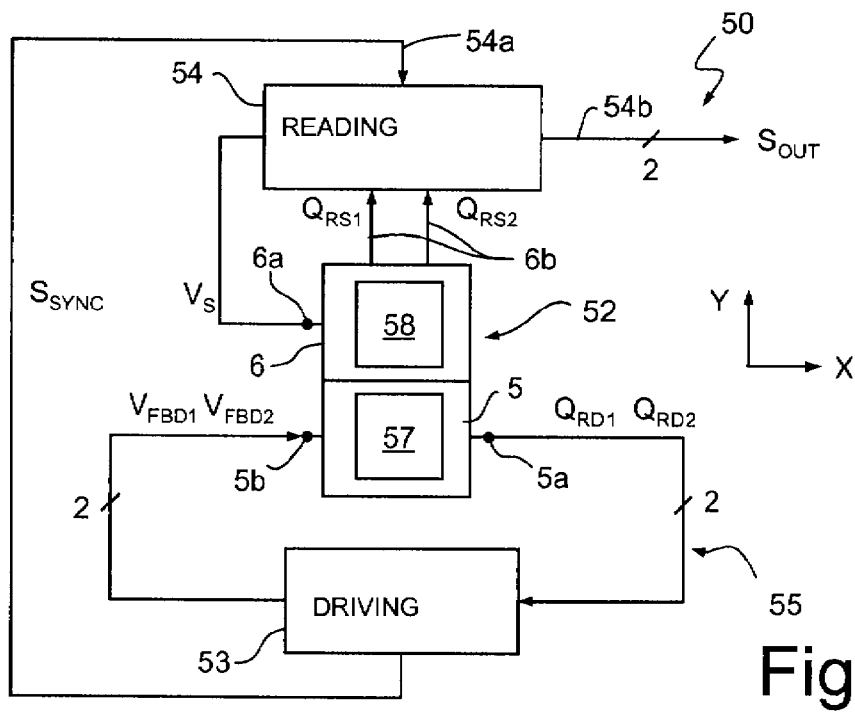
FIG. 1 is a simplified block diagram of a microelectromechanical gyroscope.

A microelectromechanical gyroscope 50, illustrated in a simplified way in the block diagram of FIG. 1, comprises a microstructure 52, made by microelectromechanical system (MEMS) technology, a driving device 53, and a reading device 54. For reasons of simplicity, in the description reference will be made to a case of a gyroscope having translating structure. However, it is understood that what is described and illustrated is applicable to microelectromechanical gyroscopes of any type, in particular to gyroscopes having rotating structure.

The microstructure 52 is provided with an actuation system 5 and an inertial sensor 6, which include respective movable masses made of semiconductor material. More precisely, the actuation system 5 comprises a driving mass 57, oscillating about a resting position according to a degree of freedom, in particular along a first axis X. The actuation system 5 is moreover provided with reading outputs 5a (defined by two stator terminals) for detecting displacements of the driving mass 57 along the first axis X, and with actuation inputs 5b (defined by two further stator terminals), for supplying actuation signals and maintaining the driving mass 57 in oscillation at its resonance frequency, in a known way. The reading outputs 5a and the actuation inputs 5b are capacitively coupled to the driving mass 57 in a known way. The inertial sensor 6 has a detection axis, having a direction of a second axis Y perpendicular to the first axis X, and comprises a detection mass 58, mechanically connected to the driving mass 57 by springs (here not shown) so as to be driven in motion along the first axis X when the driving mass 57 is excited. In addition, the detection mass 58 is relatively movable with respect to the driving mass 57 in the direction of the second axis Y and hence has a further degree of freedom. A first terminal 6a (directly connected to the detection mass 58 and here used as input terminal) and two second terminals 6b (stator terminals, here used as output terminals) of the inertial sensor 6 make it possible, respectively, to supply an excitation signal $V_S$ to the detection mass 58 and to detect displacements. The first terminal 6a is directly connected to the detection mass 58, whereas the second terminals 6b are capacitively coupled to the detection mass 58 in a known way.

The driving device 53 is connected to the microstructure 52 so as to form a feedback control loop 55, which includes the driving mass 57. The driving device 53 exploits the positive feedback control loop 55 to maintain the driving mass 57 in self-oscillation along the first axis X at its mechanical resonance frequency (for example, 25 krad/s).

The reading device 54 is of the open-loop type and, in the embodiment described, is configured for carrying out a so-called "double-ended" reading of the displacements of the detection mass 58 along the second axis Y. In particular, the reading device 54 has: a first input 54a, connected to the driving device 53 for capturing a synchronization signal $S_{SYNC}$; second inputs, connected to respective second terminals 6b of the inertial sensor 6; a first output, which is connected to the first terminal 6a of the inertial sensor 6 and supplies the excitation signal $V_S$; and second outputs 54b, which supply an output signal $S_{OUT}$, correlated to an angular velocity $\Omega$ of the microstructure 52.

Figure 2:
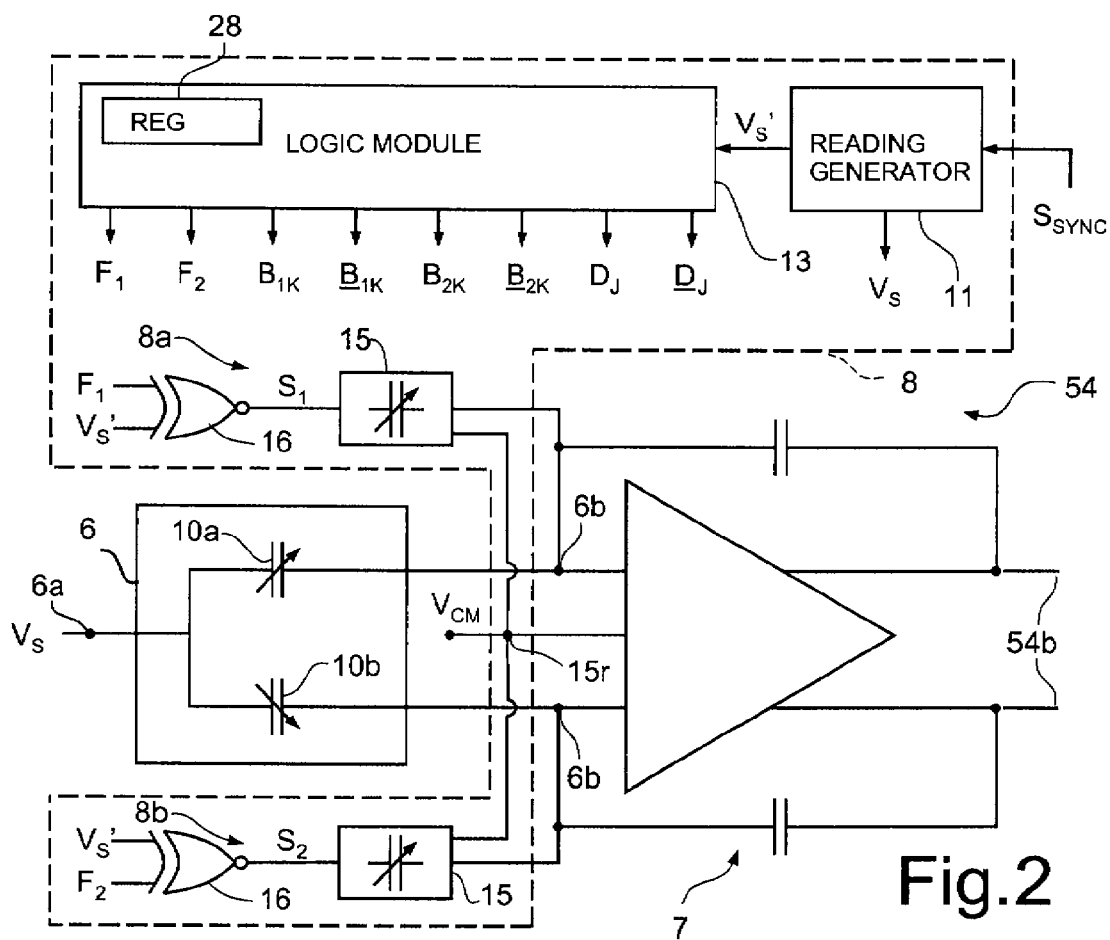
FIG. 2 is a more detailed block diagram of a portion of the gyroscope of FIG. 1, incorporating a variable-capacitance electronic device in accordance with one embodiment of the present disclosure.

FIG. 2 shows the inertial sensor 6 and a portion of the reading device 54, which comprises a charge amplifier 7 and a variable-capacitance electronic device, used as compensation stage and designated by the reference number 8.

In particular, the inertial sensor 6 is schematically represented by a pair of differential capacitors 10a, 10b, each having one terminal connected to the first terminal 6a and one terminal connected to a respective one of the second terminals 6b. The differential capacitors 10a, 10b have the same rest capacitance $C_S$ in the absence of load and present opposite (differential) capacitive variations $\Delta C_S$ in response to a displacement of the movable mass of the inertial sensor 6 (not shown).

The charge amplifier 7, which in the embodiment described is fully differential, has inputs connected to respective second terminals 6b of the inertial sensor 6 and outputs which define the second outputs 54b of the reading device 54.

The compensation stage 8 comprises a reading generator module 11 and a logic module 13 and moreover has a first branch 8a and a second branch 8b, each of which includes a capacitive component 15 with variable capacitance and a sign circuit 16. The reading generator 11 and the logic module 13 form a control stage for determining the capacitance of the capacitive components 15.

The reading generator module 11 receives the synchronization signal $S_{SYNC}$ from the driving device 53 and uses it to generate the excitation signal $V_S$. In greater detail, the synchronization signal $S_{SYNC}$ supplies a reference frequency $f_{CK}$ and a reference period $T_{CK}$ (i.e., a resonance frequency of the control loop and a corresponding period). The excitation signal $V_S$ is a square-wave signal and presents an excitation frequency $Mf_{CK}$, which is a multiple, according to an integer M, of the reference frequency $f_{CK}$ and, accordingly, a period $T_{CK}/M$. The excitation signal $V_S$ is applied to the first terminal 6a of the inertial sensor 6 and moreover serves as timing signal for the compensation stage 8. The reading generator module 11 moreover generates a logic excitation signal $V_S'$, which has the same frequency and the same phase as the excitation signal $V_S$ and levels compatible with the logic levels for the digital components incorporated in the gyroscope 50. The excitation signal $V_S$ can be directly applied to the compensation stage 8 only in a completely ratiometric system, whereas in general it may have levels that differ from the high and low logic levels. If the excitation signal $V_S$ is not ratiometric, it is hence necessary to perform a conversion, in a way in itself known, to obtain the logic excitation signal $V_S'$. If the excitation signal $V_S$ is ratiometric, the conversion is not necessary, and the excitation signal $V_S$ coincides with the logic excitation signal $V_S'$.

The logic module 13 receives the logic excitation signal $V_S'$ from the reading generator module 11 and uses it to generate a plurality of control signals, which, as explained in detail hereinafter, periodically modify the capacitance of the variable capacitive elements. In particular, the logic module 13 uses the logic excitation signal $V_S'$ to generate a first sign-control signal $F_1$ and a second sign-control signal $F_2$, which are complementary and have the reference frequency $f_{CK}$, phase signals $D_J$ and negated phase signals $\overline{D_J}$ (J=0, 1, ..., (M/4)−1; the underlining indicates the negated signal, i.e., $\overline{D_J}$=NOT $D_J$). In addition, the logic module 13 generates: first calibration signals $B_{1K}$ and first negated calibration signals $\overline{B_{1K}}$ (K=0, 1, ..., N−1, with N determined as indicated hereinafter), which determine the maximum capacitance of the capacitive component 15 of the first branch 8a of the compensation stage 8; and second calibration signals $B_{2K}$ and second negated calibration signals $\overline{B_{2K}}$, which determine the maximum capacitance of the capacitive component 15 of the second branch 8b. The first calibration signals $B_{1K}$ and the second calibration signals $B_{2K}$ are constant and are programmable in a factory calibration stage. Normally, the first calibration signals $B_{1K}$ and the corresponding second calibration signals $B_{2K}$ are the same, in order to have a balanced structure. In one embodiment, the logic module 13 generates a single series of calibration signals and of negated calibration signals, which are applied to both of the capacitive components 15.

In each branch (FIG. 2), the sign circuit 16 comprises an exclusive logic gate, which in the embodiment described is an EXNOR (exclusive NOR) gate, and receives at one input the logic excitation signal $V_S'$. In addition, the sign circuit 16 of the first branch 8a receives the first sign-control signal $F_1$, whereas the sign circuit 16 of the second branch 8b, receives the second sign-control signal $F_2$. Consequently, present on the output of the sign circuit 16 of the first branch 8a is a first compensation driving signal $S_1$, which is equal to the logic excitation signal $V_S'$, in the first half-period of each cycle, and equal to the logic excitation signal $V_S'$ negated, in the second half-period of each cycle. Present on the output of the sign circuit 16 of the second branch 8b is, instead, a second compensation driving signal $S_2$, which is equal to the logic excitation signal $V_S'$ negated, in the first half-period of each cycle, and equal to the logic excitation signal $V_S'$, in the second half-period of each cycle.

The capacitive components 15 are connected between the output of a respective sign circuit 16 and the respective second terminal 6b of the inertial sensor 6. In addition, the capacitive component 15 of the first branch 8a of the compensation stage 8 receives the first calibration signals $B_{1K}$ and the phase signals $D_J$, $\overline{D_J}$. The capacitive component 15 of the second branch 8b of the compensation stage 8 receives the second calibration signals $B_{2K}$ and the phase signals $D_J$, $\overline{D_J}$. Reference terminals 15r of the capacitive components 15 are connected to a common-mode terminal of the charge amplifier 7, on which a common-mode voltage $V_{CM}$ is present.

Figure 3:
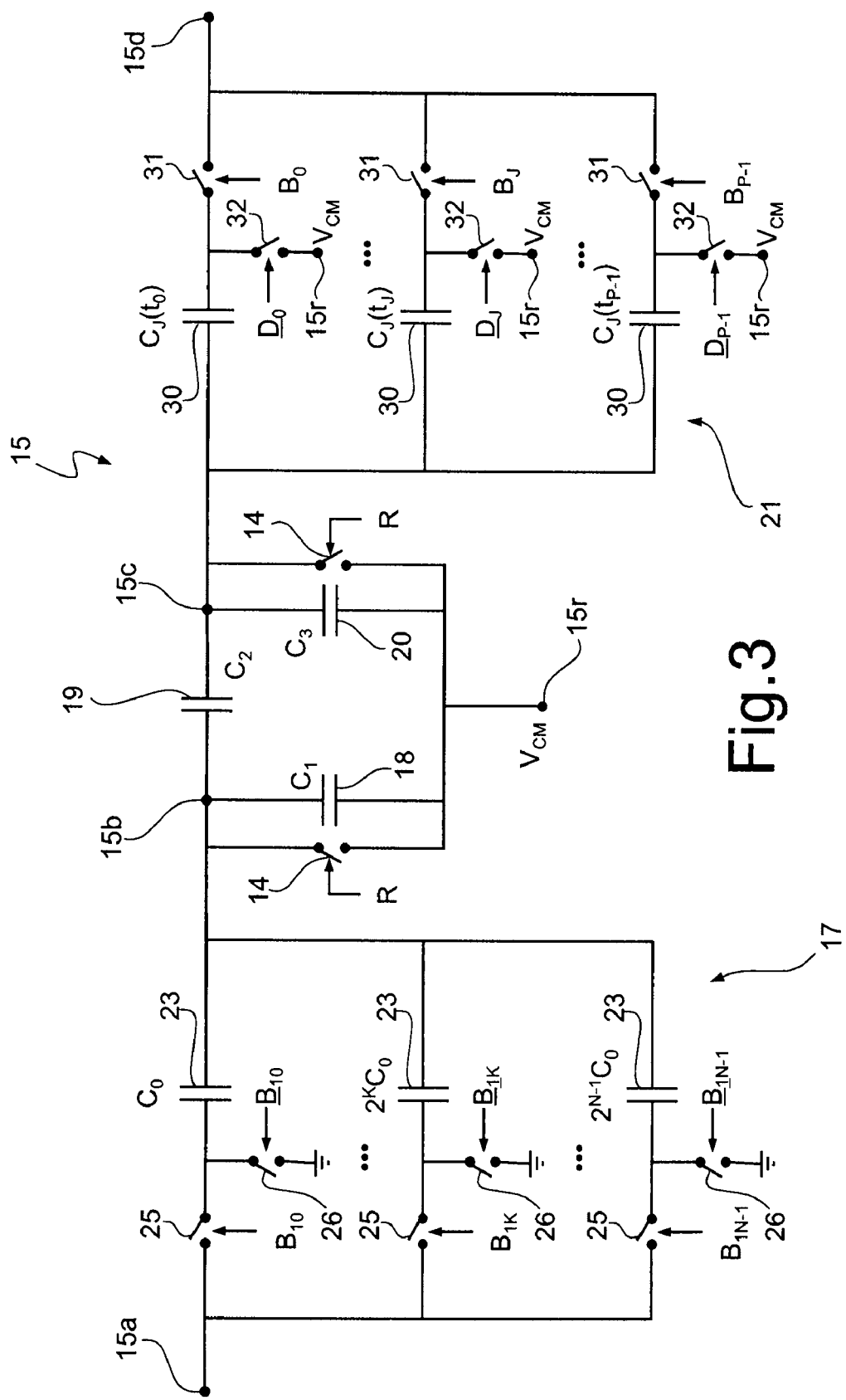
FIG. 3 is a simplified circuit schematic of the variable-capacitance electronic device of FIG. 2.

The structure of one of the capacitive components 15 (in particular that of the first branch 8a of the compensation stage 8) is illustrated in FIG. 3. It is of course understood that the structure of the other capacitive component 15 is identical and only driving is different, in so far as it is obtained by different phase signals.

The capacitive component 15 has substantially a π structure and includes a calibration network 17, connected between a first signal terminal 15a and a node 15b. A first capacitor 18, is connected between the node 15b and the reference terminal 15r and has a fixed capacitance $C_1$. A second capacitor 19, is connected between the node 15b and a node 15c and has a fixed capacitance $C_2$. A third capacitor 20, is connected between the node 15c and the reference terminal 15r and has a fixed capacitance $C_3$. A switched-capacitor compensation network 21 is connected between the node 15c and a second signal terminal 15d.

In addition, the capacitive component 15 comprises two reset switches 14, connected in parallel respectively to the first capacitor 18 and to the third capacitor 20 and controlled by a reset signal R that is equal to the logic excitation signal $V_S'$ negated. The reset signal R is generated in a known way by the reading device 54 and is used for timing the reset step of the charge amplifier 7. In a different embodiment, the reset signal R is generated by the logic module 13 starting from the logic excitation signal $V_S'$. In practice, during the reset step of the charge amplifier 7, the terminals of the first capacitor 18, of the second capacitor 19, and of the third capacitor 20 are equalized at the common-mode voltage $V_{CM}$ of the charge amplifier 7.

The calibration network 17 comprises a plurality of calibration capacitors 23, each having one terminal connected to the node 15b and one terminal selectively connectable to the first signal terminal 15a, through a respective first selection switch 25, and to ground, through a second selection switch 26.

The number N of calibration capacitors 23 have, with respect to a base calibration capacitance $C_0$, a multiple capacitance according to respective powers of 2, up to $2^{N-1}$ ($C_0$, $2C_0$ ..., $2^{N-1} C_0$).

The first selection switches 25 are controlled by respective first calibration signals $B_{1K}$, while the second selection switches 26 are controlled by the corresponding first negated calibration signals $\overline{B_{1K}}$. In practice, then, each calibration capacitor 23 is alternatively connectable between the first signal terminal 15a of the capacitive component 15 and the node 15b, or else between the node 15b and ground. The configuration of the calibration signals $B_{1K}$, $\overline{B_{1K}}$ hence determines the overall calibration capacitance $C_{CAL}$ of the calibration network 17.

In the second branch 8b of the compensation stage 8, of course, the selection switches 25, 26 are controlled by the second calibration signals $B_{2K}$, $\overline{B_{2K}}$.

The configuration of the calibration signals $B_{1K}$, $\overline{B_{1K}}$, $B_{2K}$, $\overline{B_{2K}}$ is programmable during factory calibration and is stored in a purposely provided register 28 of the logic module 13.

The compensation network 21 comprises a plurality of switched compensation capacitors 30, each having one terminal connected to the node 15c of the capacitive component 15 and one terminal selectively connectable to the second signal terminal 15d, through a respective first compensation switch 31, and to the reference terminal 15r, through a second compensation switch 32 (in practice, in parallel to the third capacitor 20). In particular, a number P of the compensation capacitors 30 is equal to M/4 (M is the ratio between the excitation frequency $Mf_{CK}$ of the excitation signal $V_S$ and the reference frequency $f_{ck}$, and is an even integer). In addition, the phase signals $D_J$ are R=P+3.

The capacitances $C_J$ of the compensation capacitors 30 are given by the following expression:

$$C_J = C_F \sin\left(\frac{2\pi}{T_{CK}} t_J\right)$$

where $t_J = JT_{CK}/P$, and $C_F$ is a constant capacitance.

In practice, hence, $$C_J = C_F \sin\left(\frac{2\pi J}{P}\right)$$

The first compensation switches 31 and the second compensation switches 32 of the compensation capacitors 30 are controlled in phase opposition by respective phase signals $D_J$ and corresponding respective negated phase signals $\overline{D_J}$.

Figure 4:
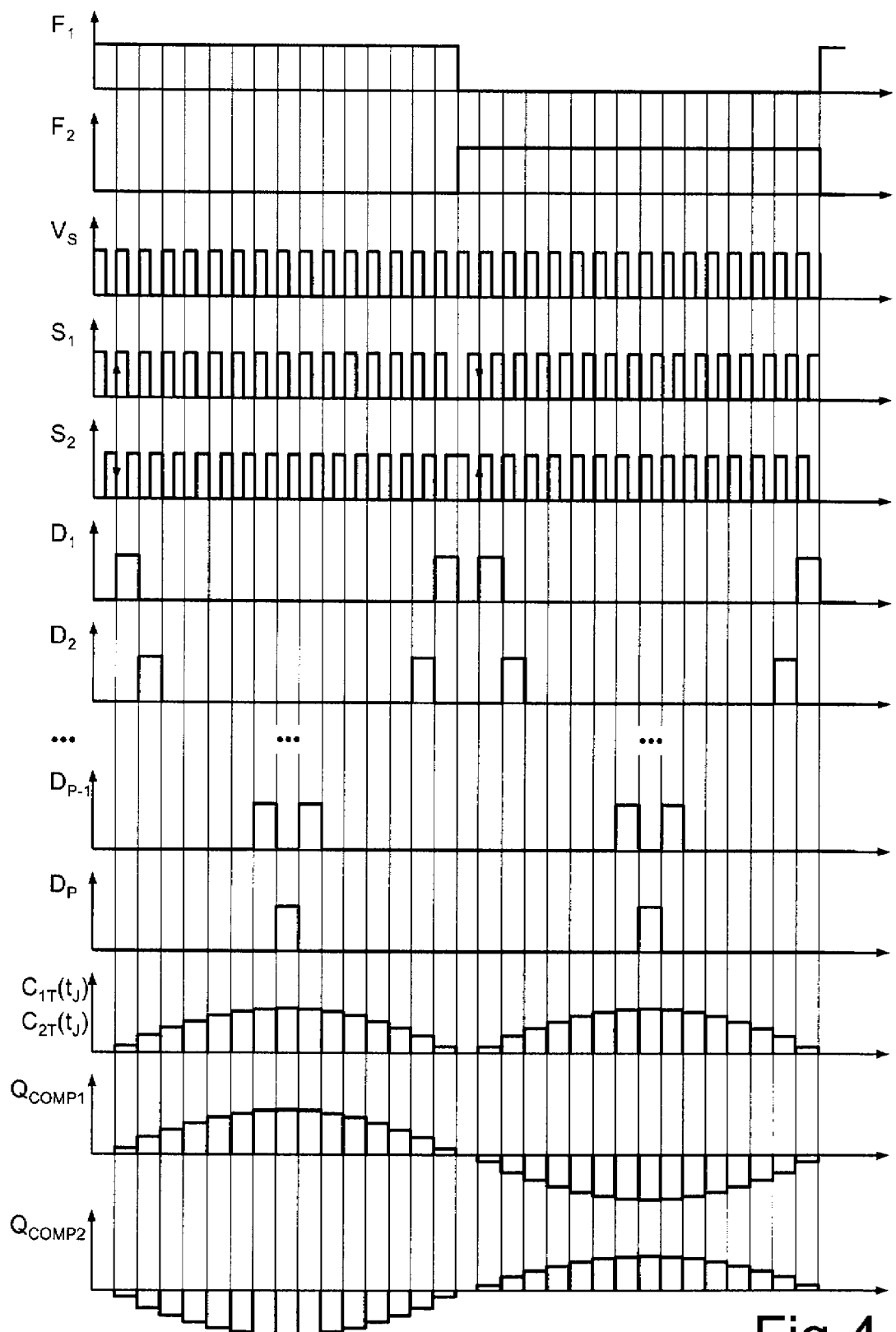
FIG. 4 is a graph that shows quantities regarding the variable-capacitance electronic device of FIG. 2.

In the embodiment described herein, the phase signals $D_J$ and the negated phase signals $\overline{D_J}$ are configured so as to connect, in each quarter of reference period $T_{CK}$, in sequence, selectively one of the compensation capacitors 31 between the node 15c and the second signal terminal 15d. In this way, the capacitance of the capacitive component 15 varies as a discrete sinusoidal half-wave with a frequency that is twice the reference frequency $f_{CK}$ (in practice, as the absolute value of a sinusoidal function with reference frequency $f_{CK}$). The scheme of the phase signals $D_J$ supplied by the logic module 13 to obtain the behavior described is shown in FIG. 4 (for simplicity, the negated phase signals $D_J$ are not illustrated). FIG. 4 also shows the excitation signal $V_S$, the sign-control signals $F_1$, $F_2$, the compensation driving signals $S_1$, $S_2$, and the instantaneous value of the capacitance $C_J$ of the capacitive component 15.

The minimum total capacitance $C_T$ (i.e., the capacitance obtained by programming the minimum value of calibration capacitance $C_{CAL}$ for the calibration network 17) of the capacitive component 15 is given by $$C_T(t_j) = \frac{C_0}{(2^P - 1)C_0 + C_1 + C_2} \frac{C_2}{C_2 + C_3 + C_{JT}} C_J$$

where $$C_{JT} = \sum_{J=1}^{P} C_J.$$

Figure 5:
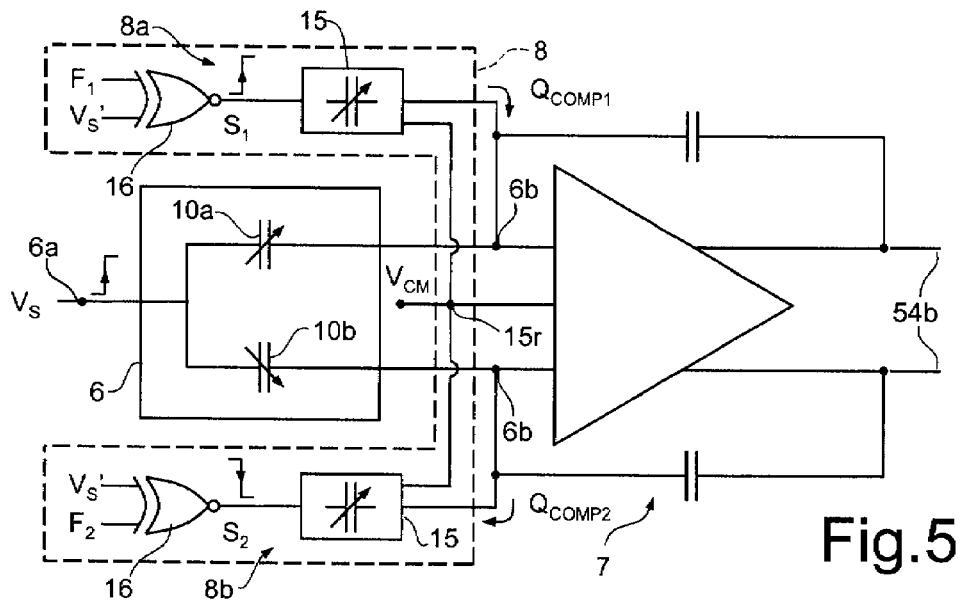
FIGS. 5 and 6 show a part of the gyroscope of FIG. 1, in a first operating configuration and in a second operating configuration, respectively.
Figure 6:
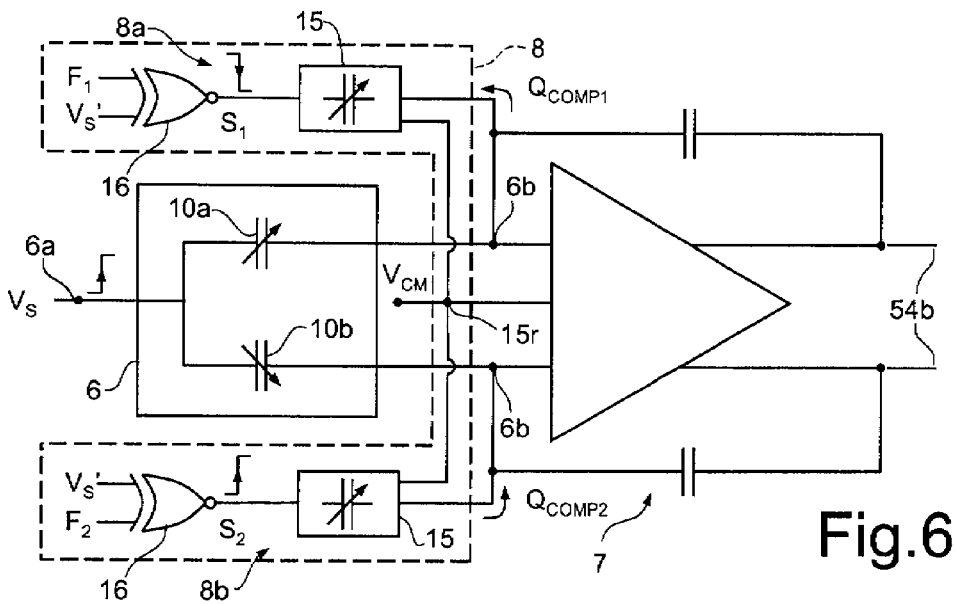

Operation of the reading device 54, which the compensation stage 8 forms part of, will now be described with reference once again to FIG. 2 and, moreover, to FIGS. 5 and 6.

The rising edges of the excitation signal $V_S$ applied to the first terminal 6a of the inertial sensor 6 produce, at the second terminals 6b, differential reading charge packets $Q_{RS1}$, $Q_{RS2}$, having a value proportional to the capacitive variations $\Delta C_S$.

The compensation stage 8, driven by the logic excitation signal $V_S'$, the sign-control signals $F_1$, $F_2$, and the phase signals $D_J$, $\overline{D_J}$, injects into (or, in a dual way, extracts from) the second terminals 6b of the sensor 6, respectively, first and second differential compensation charge packets $Q_{COMP1}$, $Q_{COMP2}$, such as to compensate for the spurious quadrature components superimposed on the signal of angular velocity. In particular, the value of the compensation charge packets $Q_{COMP1}$, $Q_{COMP2}$ varies sinusoidally within a period, at the reference frequency $f_{CK}$, and is determined by the value of the total capacitances $C_{1T}(t_j)$, $C_{2T}(t_j)$ of the capacitive components 15, in combination with the respective compensation driving signals $S_1$, $S_2$.

In greater detail, the total capacitances $C_{1T}(t_j)$, $C_{2T}(t_j)$ vary according to the absolute value of a sinusoid. However, sign-control signals $F_1$, $F_2$ reverse, at each half-period, the sign of the wave fronts applied to the second terminals 6b of the inertial sensor 6 through the capacitive components 15 and hence the sign of the compensation charge packets $Q_{COMP1}$, $Q_{COMP2}$. Here and in what follows, it is understood that the rising edges of a signal have one sign, for example, positive, and the falling edges have an opposite sign, for example, negative. In addition, it is understood that two signals of the same frequency have concordant edges when corresponding edges of the two signals have the same sign, i.e., when rising edges and falling edges of one of the two signals correspond, respectively, to rising edges and to falling edges of the other signal, and it is understood that two signals of the same frequency have discordant edges when corresponding edges of the two signals have opposite sign, i.e., when rising edges and falling edges of one of the two signals correspond, respectively, to falling edges and to rising edges of the other signal.

In the first half-period of each cycle, in particular (FIGS. 3 and 5), the first sign-control signal $F_1$ is high (logic value "1") and hence the first compensation driving signal $S_1$ corresponds to the logic excitation signal $V_S'$. Vice versa, the second sign-control signal $F_2$ is low (logic value "0"), and hence the second compensation driving signal $S_2$ corresponds to the logic excitation signal $V_S'$ negated. Hence, as is represented in FIG. 5, the rising edges of the logic excitation signal $V_S'$ correspond to the rising edges (concordant edges) of the first compensation driving signal $S_1$ and to the falling edges (discordant edges) of the second compensation driving signal $S_2$. The perturbation determined by a positive wave front (from "0" to "1", first branch 8a) causes injection of a charge packet (positive charge), while the perturbation determined by a negative wave front (from "1" to "0", second branch 8b) causes extraction of a charge packet (negative charge). Consequently, in the first branch 8a the first compensation charge packets $Q_{COMP1}$ vary according to a positive sinusoidal half-wave, while, in the second branch 8b, the second compensation charge packets $Q_{COMP2}$ vary according to a negative sinusoidal half-wave.

In the second half-period of each cycle (FIGS. 4 and 6), the sign-control signals $F_1$, $F_2$ switch, reversing the compensation driving signals $S_1$, $S_2$. Also the evolution of the compensation charge packets $Q_{COMP1}$, $Q_{COMP2}$ is hence reversed both in the first branch 8a and in the second branch 8b: in the first branch 8a, the first compensation charge packets $Q_{COMP1}$ vary according to a negative sinusoidal half-wave, whilst, in the second branch 8b, the second compensation charge packets $Q_{COMP2}$ vary according to a positive sinusoidal half-wave.

The maximum amplitude of the compensation charge packets $Q_{COMP1}$, $Q_{COMP2}$ is determined in the factory calibration stage. This is possible because the quadrature components of disturbance are for the most part due to intrinsic structural factors of the inertial sensor 6, and the operating conditions have only a marginal effect. The calibration is performed by modifying the configuration of the calibration signals $B_{1K}$, $\overline{B_{1K}}$ stored in the register 28 of the logic module 13, until an adequate calibration capacitance $C_{CAL}$ is obtained.

The calibration module 8 thus enables suppression of the quadrature disturbance with respect to the useful signal in an effective, simple, and precise way. In particular, the value of the calibration capacitance can be adjusted in an extremely fine way, thanks to the configuration of the calibration capacitors 23. It is in fact possible to obtain adjustments of the order of the attofarad ($10^{-18}$ F).

Figure 7:
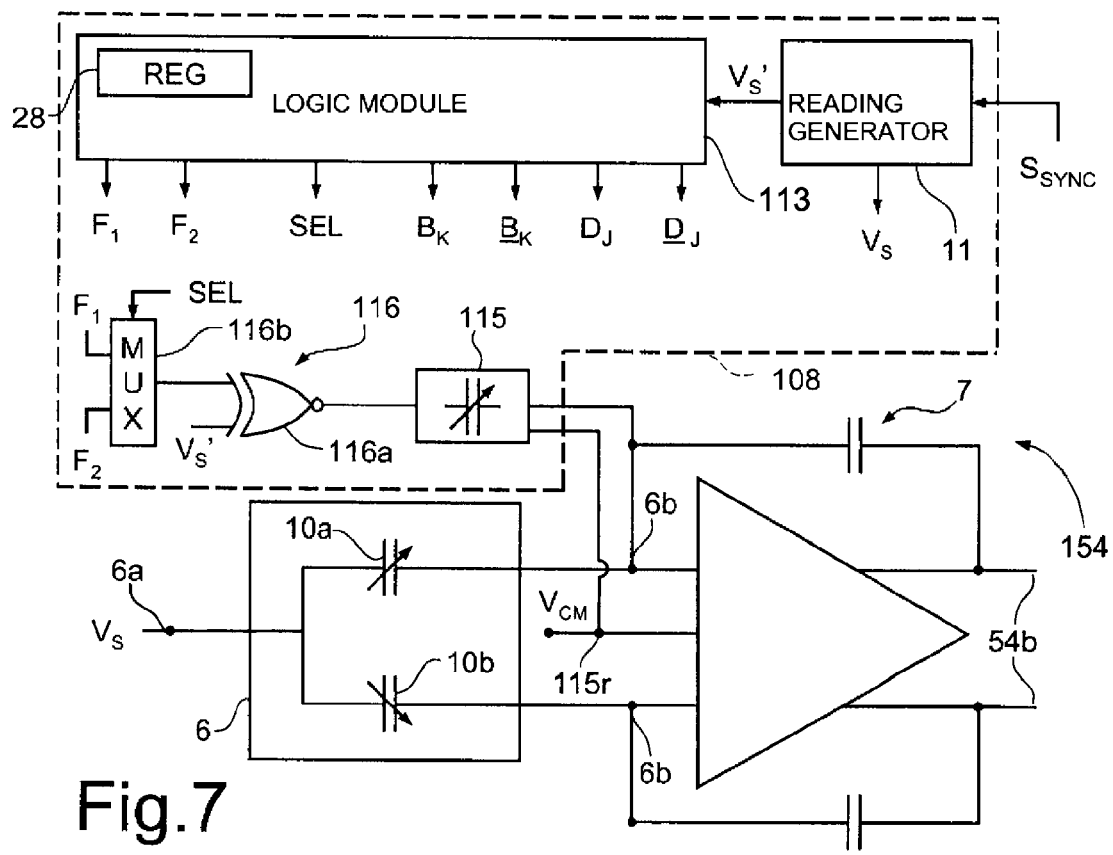
FIG. 7 is a block diagram of a portion of a gyroscope incorporating a variable-capacitance electronic device in accordance with another embodiment of the present disclosure.

FIG. 7 illustrates a different embodiment of the disclosure, in which a variable-capacitance electronic device is used as asymmetrical compensation stage of a reading device 154 and is designated by the number 108. In this case, the compensation stage 108 comprises a single branch and is connected to just one of the second terminals 6b of the inertial sensor 6. The compensation stage 108 comprises a phase-generator module 113, which, starting from the logic excitation signal $V_S'$, supplies the sign-control signals $F_1$, $F_2$, the compensation signals $D_J$, and the negated compensation signals $\overline{D}$. In addition, the compensation stage 108 generates a selection bit SEL and a single series of calibration signals $B_K$ and of negated calibration signals $\overline{B_K}$.

The compensation stage 108 also comprises a variable-capacitance capacitive component 115, having the same structure as the one already described with reference to FIG. 3 and a reference terminal 115r connected to a common-mode terminal of the charge amplifier 7.

A sign circuit 116 comprises an exclusive logic gate 116a (EXNOR gate) and a multiplexer 116b, which receives the sign-control signals $F_1$, $F_2$ at inputs and is controlled by the selection bit SEL, which is programmable in the factory calibration stage. The output of the multiplexer 116b is fed to a first input of the exclusive logic gate 116a, which receives on a second input the logic excitation signal $V_S'$. The output of the exclusive logic gate 116a supplies a compensation driving signal $S_1$.

In practice, during calibration, the sign-control signal $F_1$, $F_2$ necessary for compensation is determined, as well as the value of the calibration capacitance $C_{CAL}$.

The solution just described enables reduction of the number of phase signals necessary.

Figure 8:
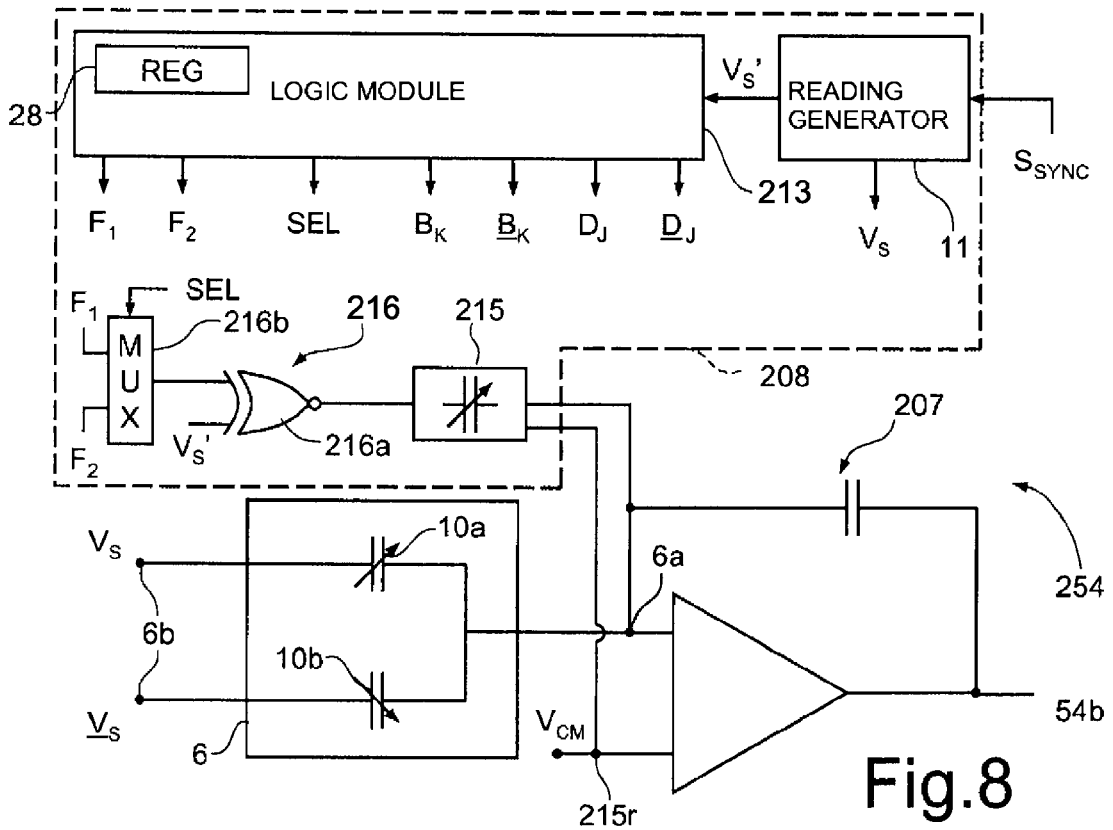
FIG. 8 is a block diagram of a portion of a gyroscope incorporating a variable-capacitance electronic device in accordance with a further embodiment of the present disclosure.

In the embodiment illustrated in FIG. 8, a reading device 254 is configured for performing a reading operation of a "single-ended" type of the inertial sensor 6. In particular, the reading device 254 comprises a charge amplifier 207, a variable-capacitance electronic device, used as compensation stage and designated by 208, and the reading generator module 11, which applies the excitation signal $V_S$ to the second terminals 6b of the inertial sensor 6 (here used as input terminals) and to an input of a logic module 213. The charge amplifier 207 has an input connected to ground and an input connected to the first terminal 6a of the inertial sensor 6 (here used as output terminal), from which it receives reading charge packets $Q_S$, indicating the differential capacitive variations $\Delta C_S$ of the differential capacitors 10a, 10b.

The compensation stage 208 has substantially the same structure as the compensation stage 108 of FIG. 7 and comprises a logic module 213, a variable-capacitance capacitive component 215, and a sign circuit 216.

Starting from the logic excitation signal $V_S'$, the logic module 213 supplies a selection bit SEL, the sign-control signals $F_1$, $F_2$, the compensation signals $D_J$, the negated compensation signals $\overline{D_J}$, and a single series of calibration signals $B_K$ and of negated calibration signals $\overline{B_K}$.

The capacitive component 215 has the same structure as the one already described with reference to FIG. 3 and has a reference terminal 215r connected to a common-mode terminal of the charge amplifier 207.

The sign circuit 216 is of the type described in FIG. 7 and comprises an exclusive logic gate 216a (EXNOR gate) and a multiplexer 216b. The multiplexer 216b receives the sign-control signals $F_1$, $F_2$ at inputs and is controlled by the selection bit SEL, which is programmable in the factory calibration stage. The output of the multiplexer 216b is fed to a first input of the exclusive logic gate 216a, which receives on a second input the logic excitation signal $V_S'$. The output of the exclusive logic gate 216a supplies a compensation driving signal $S_1$.

Figure 9:
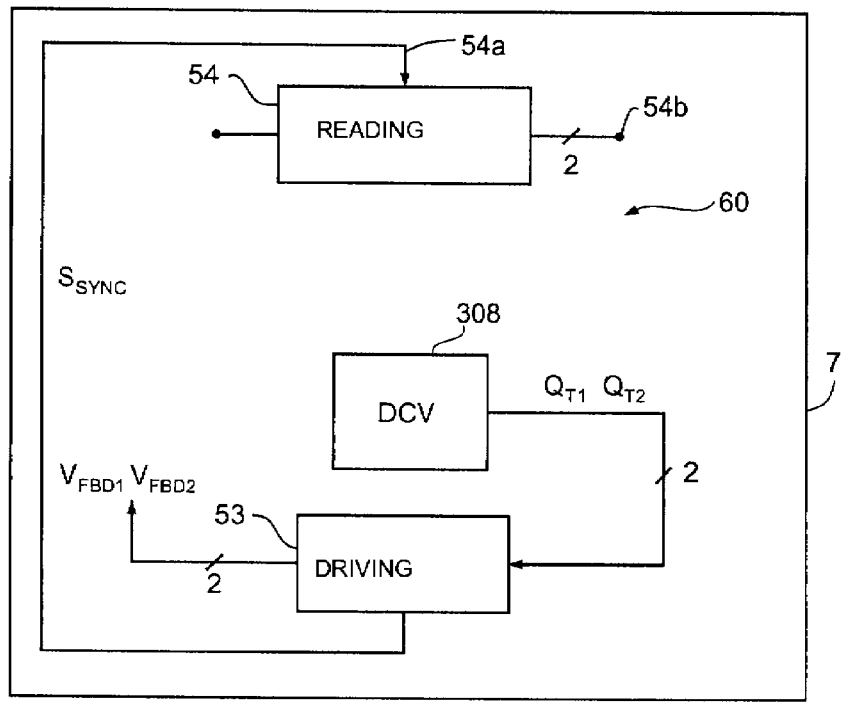
FIG. 9 shows an apparatus for electrical-wafer-sorting testing incorporating a variable-capacitance electronic device in accordance with an embodiment of the present disclosure.
Figure 10:
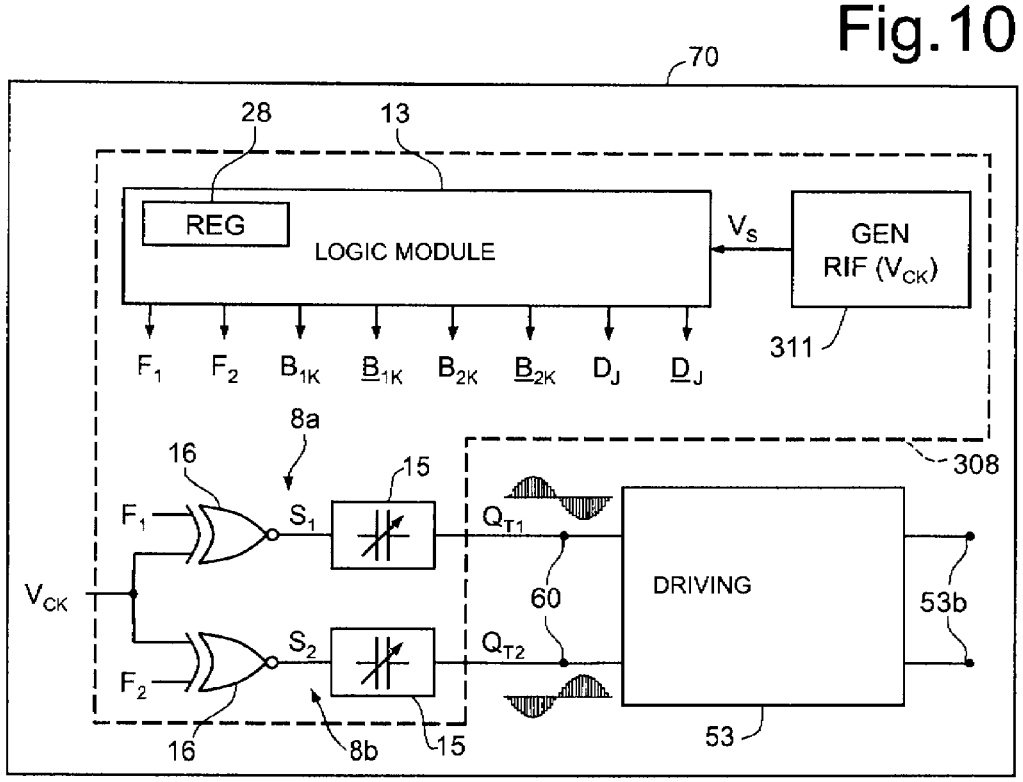
FIG. 10 is a more detailed block diagram of a part of the apparatus of FIG. 9.

FIGS. 9 and 10 illustrate a different application of the variable-capacitance electronic device described with reference to FIGS. 1-6. In particular, a variable-capacitance electronic device is used here as signal generator and is designated by the number 308 in the EWS (electrical-wafer-sorting) testing step to supply a periodic signal, in particular a discrete-time sinusoidal signal. In practice, the circuit part of the gyroscope or ASIC (Application-Specific Integrated Circuit) 60 is checked at the wafer level, prior to cutting. In the example of FIGS. 9 and 10, a wafer 70 of semiconductor material incorporates a plurality of ASICs 60 (only one of which is illustrated). Each ASIC 60 comprises, in addition to the driving device 53 and to the reading device 54, a respective example of the variable-capacitance electronic device 308. The terminals of the capacitive components 15 of the variable-capacitance electronic device 308 are connected to input terminals of the driving device 53.

Instead of the reading generator 11, in this case a reference generator 311 is used, which generates internally a square-wave reference signal $V_{CK}$, with reference frequency $f_{CK}$ and reference period $T_{CK}$, close to the resonance frequency and period of the microstructure. On the basis of the reference signal $V_{CK}$, moreover, the reference generator 311 generates an excitation signal $V_S$, which has an excitation frequency that is a multiple of the reference frequency $f_{CK}$ ($Mf_{CK}$) and is supplied to the logic module 13 and to the sign circuits 16 of the two branches 8a, 8b of the signal generator 308.

In practice, the signal generator 308, driven by the reference signal $V_{CK}$, supplies the driving device $S_3$ with discrete-time sinusoidally-variable test charge packets $Q_{T1}$, $Q_{T2}$, in the form of charge packets, as already described with reference to FIG. 4. In other words, the signal generator 308 simulates the behavior of the inertial sensor 6 and hence can be used for extending the EWS tests also to the driving device 53.

It should be noted that, as regards the reading device 54, the EWS tests can be performed using the variable-capacitance electronic device already incorporated and forming the compensation stage 8.

Figure 11:
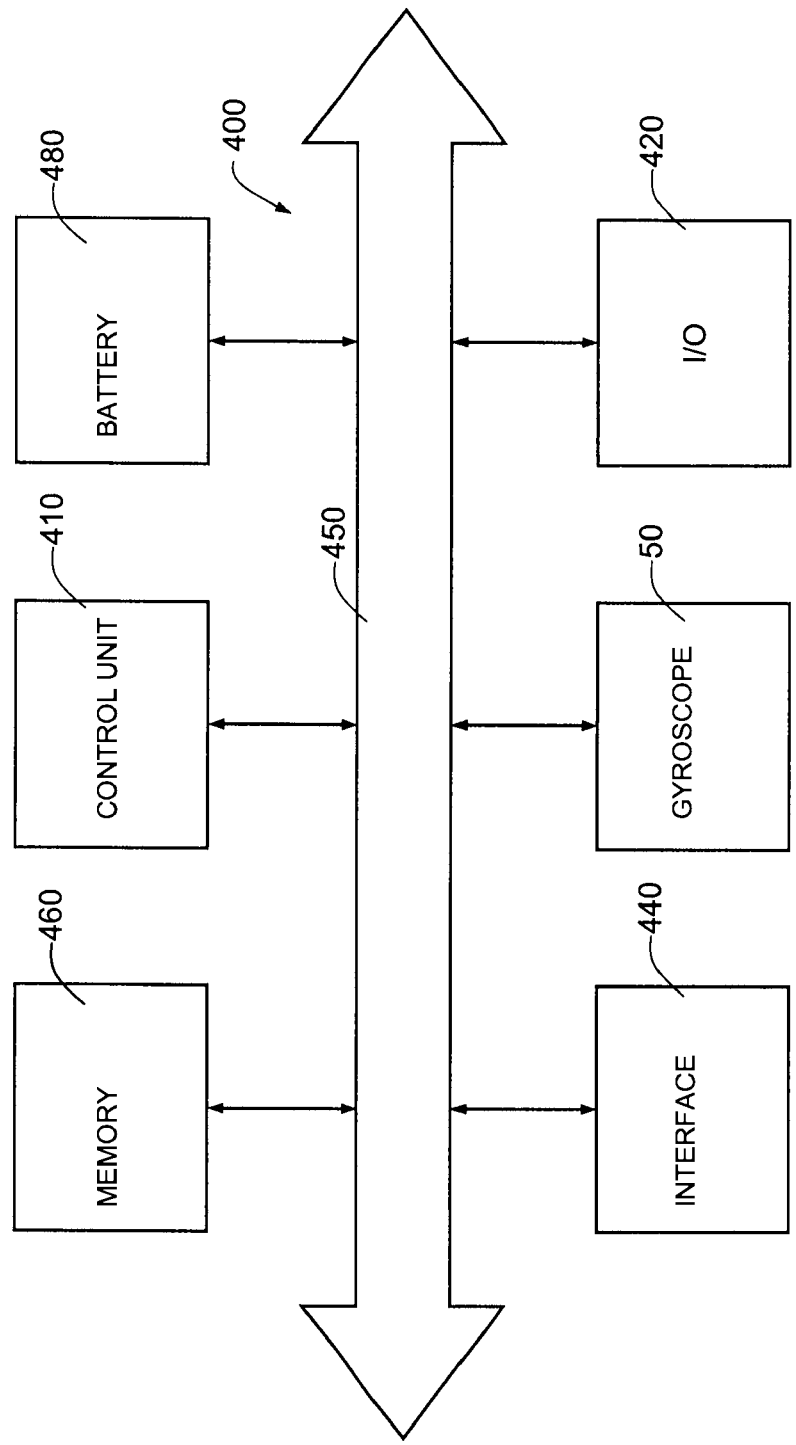
FIG. 11 is a simplified block diagram of an electronic system incorporating a microelectromechanical gyroscope provided with a variable-capacitance electronic device according to an embodiment of the present disclosure.

FIG. 11 illustrates a portion of a system 400 in accordance with an embodiment of the present disclosure. The system 400 may be used in devices, such as, for example, a palm-top computer (personal digital assistant, PDA), a laptop or portable computer, possibly with wireless capacity, a cell phone, a messaging device, a digital music player, a digital camera or other devices designed to process, store, transmit or receive information. For example, the gyroscope 50 may be used in a digital camera for detecting movements and performing an image stabilization. In other embodiments, the gyroscope 50 is included in a portable computer, a PDA, or a cell phone to detect a free-fall condition and activate a safety configuration. In a further embodiment, the gyroscope 50 is included in a user interface activated by movement for computers or consoles for videogames.

The system 400 may comprise a controller 410, an input/output (I/O) device 420 (for example, a keyboard or a screen), the gyroscope 50, a wireless interface 440, and a memory 460, of a volatile or non-volatile type, coupled to one another through a bus 450. In one embodiment, a battery 480 may be used for a power supply of the system 400. It should be noted that the scope of the present disclosure is not limited to embodiments having necessarily one or all of the devices listed.

The controller 410 may comprise, for example, one or more microprocessors, microcontrollers, and the like.

The I/O device 420 may be used to generate a message. The system 400 may use the wireless interface 440 for transmitting and receiving messages to and from a wireless communication network with a radiofrequency (RF) signal. Examples of wireless interface may comprise an antenna, a wireless transceiver, such as a dipole antenna, even though the scope of the present disclosure is not limited from this standpoint. In addition, the I/O device 420 may supply a voltage representing what is stored both in the form of digital output (if digital information has been stored) and in form of analog information (if analog information has been stored).

Finally, it is evident that modifications and variations can be made to the device and to the method described, without thereby departing from the scope of the present disclosure.

In particular, the capacitance of the calibration capacitors could be determined in such way that the total capacitance of the variable-capacitance bipole varies according to a periodic curve different from a sinusoid (or from the absolute value of a sinusoid).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A variable capacitance electronic device, comprising:
a first capacitive component, having a variable capacitance and including:
   a first signal terminal;
   a second signal terminal; and
   a variable capacitive network having:
      a plurality of switched capacitors, each switched capacitor being selectively switchable between a first configuration and a second configuration, in the first configuration the switched capacitor being electrically coupled between the first signal terminal and the second signal terminal and in the second configuration the switched capacitor being electrically coupled to at most one of the first signal terminal and the second signal terminal;
a control stage electrically coupled to the first capacitive component and configured to control the variable capacitance based on a reference signal and an excitation signal, the reference signal having a reference frequency and the excitation signal having an excitation frequency that is a multiple of the reference frequency, the control stage including:
   a logic module configured to periodically switch each switched capacitor between the first and the second configuration, based on the reference signal; and
   a first sign circuit electrically coupled to the first capacitive component and configured to provide a first control signal to the first capacitive component, the first control signal having concordant edges with the excitation signal in one half-period of each cycle of the reference signal and discordant edges with the excitation signal in the other half-period of each cycle of the reference signal.

2. The electronic device according to claim 1 wherein the logic module is configured to sequentially place one of the switched capacitors in the first configuration and another one of the switched capacitors in the second configuration.

3. The electronic device according to claim 2 wherein the switched capacitors in the second configuration are connected in parallel between a first intermediate node and a reference terminal.

4. The electronic device according to claim 1 wherein the switched capacitors have respective capacitances given by:

$$C_J = C_F \sin\left(\frac{2\pi J}{P}\right)$$
$$J = 0, \ldots, P-1$$

where $C_F$ is a constant capacitance and P is a number of the switched capacitors.

5. The electronic device according to claim 1 wherein the variable capacitive network includes switches configured to switch respective switched capacitors between the first and the second configuration, and wherein the logic module is configured to generate a respective phase signal to control the switch of each switched capacitor.

6. The electronic device according to claim 1 wherein the first capacitive component includes a calibration network.

7. The electronic device according to claim 6 wherein the calibration network comprises a plurality of calibration capacitors, each of which is selectively switchable between a first configuration, in which the calibration capacitor is electrically coupled between the first signal terminal and the second signal terminal, and a second configuration, in which the calibration capacitor is electrically coupled to at most one of the first signal terminal and the second signal terminal.

8. The electronic device according to claim 7, wherein the switched capacitors in the second configuration are connected in parallel between a first intermediate node and a reference terminal and the calibration capacitors in the second configuration are connected in parallel between a second intermediate node and a reference line.

9. The electronic device according to claim 8 wherein the calibration network comprises a selection device configured to switch respective calibration capacitors between the first and the second configuration, and wherein the logic module is configured to generate calibration signals to control the selection device of each calibration capacitor.

10. The electronic device according to claim 8, comprising three fixed capacitance capacitors respectively electrically coupled between the first intermediate node and the reference line, the second intermediate node and the reference line, and between the first intermediate node and the second intermediate node.

11. The electronic device according to claim 1, having a first branch, including the first capacitive component and the first sign circuit, and a second branch, including a second capacitive component and a second sign circuit, electrically coupled to the second capacitive component and configured to supply a second control signal having discordant edges with the first control signal provided by the first sign circuit of the first branch.

12. The electronic device according to claim 11 wherein the logic module is electrically coupled to the first sign circuit of the first branch and to the second sign circuit of the second branch, the logic module is configured to supply a first and a second sign control signal, respectively, the first and second sign control signals being complementary and having the reference frequency, and the first sign circuit of the first branch and the second sign circuit of the second branch are configured to generate the first control signal and the second control signal based on the first and the second sign control signal, respectively.

13. A microelectromechanical device, comprising:
an inertial sensor;
a charge amplifier electrically coupled to the inertial sensor; and
a compensation stage, having a variable capacitance electronic device that includes:
   a first capacitive component, having a variable capacitance, the first capacitive component including:
      a first signal terminal;
      a second signal terminal; and
      a variable capacitive network having:
         a plurality of switched capacitors, each switched capacitor being selectively switchable between a first configuration and a second configuration, in the first configuration the switched capacitor is electrically coupled between the first signal terminal and the second signal terminal of the capacitive component, and in the second configuration the switched capacitor is electrically coupled to at most one of the first signal terminal and the second signal terminal;

a control stage electrically coupled to the first capacitive component configured to control the variable capacitance based on a reference signal and an excitation signal, the reference signal having a reference frequency and the excitation signal, having an excitation frequency that is a multiple of the reference frequency, the control stage including:

a logic module electrically coupled to the variable capacitive network and configured to periodically switch each switched capacitor between the first and the second configuration, based on the reference signal; and a first sign circuit electrically coupled to the first capacitive component and configured to provide a first control signal to the first capacitive component, the first control signal having concordant edges with the excitation signal in one half-period of each cycle of the reference signal and discordant edges with the excitation signal in the other half-period of each cycle of the reference signal.

14. The microelectromechanical device according to claim 13 wherein one of the first signal terminal and the second signal terminal of the capacitive component is electrically coupled to a first output terminal of the inertial sensor.

15. The microelectromechanical device according to claim 14, having a first branch, including the first capacitive component and the first sign circuit, and a second branch, including a second capacitive component and a second sign circuit, electrically coupled to the second capacitive component and configured to supply a second control signal having discordant edges with the first control signal provided by the first sign circuit of the first branch, wherein the first capacitive component of the first branch and the second capacitive component of the second branch are electrically coupled to the first output terminal and a second output terminal, respectively, of the inertial sensor.

16. The microelectromechanical device of claim 15 wherein the logic module is electrically coupled to the first sign circuit of the first branch and to the second sign circuit of the second branch, the logic module is configured to supply a first and a second sign control signal, respectively, the first and the second sign control signals being complementary and having the reference frequency, and wherein the first sign circuit of the first branch and the second sign circuit of the second branch are configured to generate the first control signal and the second control signal based on the first and the second sign control signal, respectively.

17. A system, comprising:
a control unit, and
a device electrically coupled to the control unit, the device comprising:
an inertial sensor;
a charge amplifier electrically coupled to the inertial sensor; and
a compensation stage having a variable capacitance electronic device that includes:
a capacitive component, having a variable capacitance, the capacitive component including:
a first signal terminal;
a second signal terminal; and
a variable capacitive network having:
a plurality of switched capacitors, each switched capacitor being selectively switchable between a first configuration and a second configuration, in the first configuration the switched capacitor is electrically coupled between the first signal terminal and the second signal terminal of the capacitive component, and in the second configuration the switched capacitor is electrically coupled to at most one of the first signal terminal and the second signal terminal;

a control stage electrically coupled to the capacitive component and configured to control the variable capacitance based on a reference signal and on an excitation signal, the reference signal having a reference frequency and the excitation signal having an excitation frequency that is a multiple of the reference frequency, the control stage including:

a logic module electrically coupled to the variable capacitive network and configured to periodically switch each switched capacitor between the first and the second configuration, based on the reference signal; and a sign circuit electrically coupled to the capacitive component and configured to provide a control signal to the capacitive component, the control signal having concordant edges with the excitation signal in one half-period of each cycle of the reference signal and discordant edges with the excitation signal in the other half-period of each cycle of the reference signal.

18. The system according to claim 17 wherein the logic module is configured to sequentially place one of the switched capacitors in the first configuration and another one of the switched capacitors in the second configuration.

19. The system according to claim 18 wherein the switched capacitors in the second configuration are connected in parallel between a first intermediate node and a reference terminal.

20. An electrical wafer sorting test apparatus for a driving device of a microelectromechanical gyroscope, comprising:
a semiconductor wafer that includes:
a microelectromechanical gyroscope having a driving mass;
a driving device having an input terminal, the driving device being configured to be electrically coupled to the microelectromechanical gyroscope and configured to maintain the driving mass of the microelectromechanical gyroscope in oscillation at a resonance frequency; and
a variable capacitance electronic device that includes:
a capacitive component, having a variable capacitance, the capacitive component being electrically coupled to the input terminal of the driving device, the capacitive component including:
a first signal terminal;
a second signal terminal; and
a variable capacitive network having:
a plurality of switched capacitors, each switched capacitor being selectively switchable between a first configuration and a second configuration, in the first configuration the switched capacitor is electrically coupled between the first signal terminal and the second signal terminal of the capacitive component, and in the second configuration the switched capacitor is electrically coupled to at most one of the first signal terminal and the second signal terminal;

a control stage electrically coupled to the capacitive component configured to control the variable capacitance based on a reference signal and an excitation signal, the reference signal having a reference frequency and the excitation signal having an excitation frequency that is a multiple of the reference frequency;
a logic module electrically coupled to the variable capacitive network and configured to periodically switch each switched capacitor between the first and the second configuration, based on the reference signal; and
a sign circuit electrically coupled to the capacitive component and configured to provide a control signal to the capacitive component, the control signal having concordant edges with the excitation signal in one half-period of each cycle of the reference signal and discordant edges with the excitation signal in the other half-period of each cycle of the reference signal.

21. The electrical wafer sorting test apparatus system according to claim 20 wherein the logic module is configured to sequentially place one of the switched capacitors in the first configuration and another one of the switched capacitors in the second configuration.

22. The electrical wafer sorting test apparatus according to claim 20 wherein the switched capacitors in the second configuration are connected in parallel between a first intermediate node and a reference terminal.

23. A method of forming a microelectromechanical device, the method comprising:
forming an inertial sensor;
forming a charge amplifier electrically coupled to the inertial sensor;
forming a compensation stage having a variable capacitance electronic device, the forming of the compensation stage includes:
  forming a first capacitive component, having a variable capacitance;
  forming a control stage electrically coupled to the first capacitive component and configured to control the variable capacitance based on a reference signal and on an excitation signal, the reference signal having a reference frequency and the excitation signal having an excitation frequency that is a multiple of the reference frequency;
  forming a variable capacitive network in the first capacitive component, the variable capacitive network having a plurality of switched capacitors, each of which is selectively switchable between a first configuration, in which the switched capacitor is electrically coupled between a first signal terminal and a second signal terminal of the first capacitive component, and a second configuration, in which the switched capacitor is electrically coupled to at most one of the first signal terminal and the second signal terminal;
  forming a logic module in the control stage electrically coupled to the variable capacitive network and configured to periodically switch each switched capacitor between the first and the second configuration, based on the reference signal; and
  forming a first sign circuit electrically coupled to the first capacitive component and configured to provide a first control signal to the first capacitive component, the first control signal having concordant edges with the excitation signal in one half-period of each cycle of the reference signal and discordant edges with the excitation signal in the other half-period of each cycle of the reference signal.

24. The method of claim 23, further comprising:
forming a first output terminal of the inertial sensor; and
coupling one of the first signal terminal and the second signal terminal of the first capacitive component to the output terminal.

25. The method of claim 24, further comprising:
forming a first branch that includes the first capacitive component and the first sign circuit;
forming a second branch that includes a second capacitive component and a second sign circuit coupled to the second capacitive component and configured to supply a second control signal having discordant edges with the first control signal provided by the first sign circuit of the first branch; and
connecting the first capacitive component of the first branch and the second capacitive component of the second branch to the first output terminal and a second output terminal of the inertial sensor.

* * * * *